TRUNK CIRCUIT WITH SPECIAL TIMING OUT FEATURE

Filed Dec. 1, 1955 5 Sheets-Sheet 1

INVENTOR.
ERNEST H. GATZERT
BY J. Warren Whitesel
ATTORNEY

Aug. 13, 1957 E. H. GATZERT 2,802,901

TRUNK CIRCUIT WITH SPECIAL TIMING OUT FEATURE

Filed Dec. 1, 1955 5 Sheets-Sheet 4

TRUNK CIRCUIT WITH SPECIAL TIMING OUT FEATURE

Filed Dec. 1, 1955 5 Sheets-Sheet 5

2,802,901
Patented Aug. 13, 1957

2,802,901

TRUNK CIRCUIT WITH SPECIAL TIMING OUT FEATURE

Ernest H. Gatzert, Rochester, N. Y., assignor to General Dynamics Corporation, a corporation of Delaware Application December 1, 1955, Serial No. 550,281

4 Claims. (Cl. 179—16)

This invention relates to trunk circuits and more particularly to trunk circuits for distinguishing between calls of different classes.

Very often telephone equipment is designed to provide different classes of service depending upon the destination of the call. For example, one class of calls may be directed to a called subscriber under conditions which require conversation timing. However, conversation timing on another class of calls such as calls which are extended under the control of an operator at a distant office is usually considered undesirable because the operator is manually supervising the call and determines the charges to be made for that call. There is no need to disconnect the conversation path after the expiration of a fixed interval of time. Quite the contrary, it would be an expensive process to waste time holding valuable equipment to reconnect calls of this class which had been released incorrectly. In addition to functions of this type, a telephone system may provide many other functions which are normally required during the completion of calls. These other functions require various relays. Therefore, there would be a saving if the relays that are normally used to complete calls are reused to distinguish between the classes of calls.

It seems fairly obvious that the example given above, which relates to the classification of calls according to the need for conversation timing, is merely an illustration which was selected at random to facilitate the explanation of why it may be necessary to determine the class of a called line. It also seems obvious that there are many other functions upon which classification of calls could be based, such as the need for coin control and automatic ringing, for example.

An object of this invention is to provide a new and improved two-way trunk circuit.

Another object of this invention is to provide level marking in a trunk circuit without requiring the addition of further relays.

Still another object of this invention is to adapt a trunk circuit to provide selective circuit features depending upon the destination of a call.

It is thought that these and other objects will be obvious from a study of the attached drawings when taken in connection with the following specification in which.

The patent drawings show the office potential by means of a simple plus (+) and minus (−) signs. As in the case of most telephone circuits, the positive terminal is described as being connected with ground; hence, the terms "(−) battery" and "ground (+)" have been used. It should be understood that either this or any other suitable power source could be used.

Figures 1, 6:
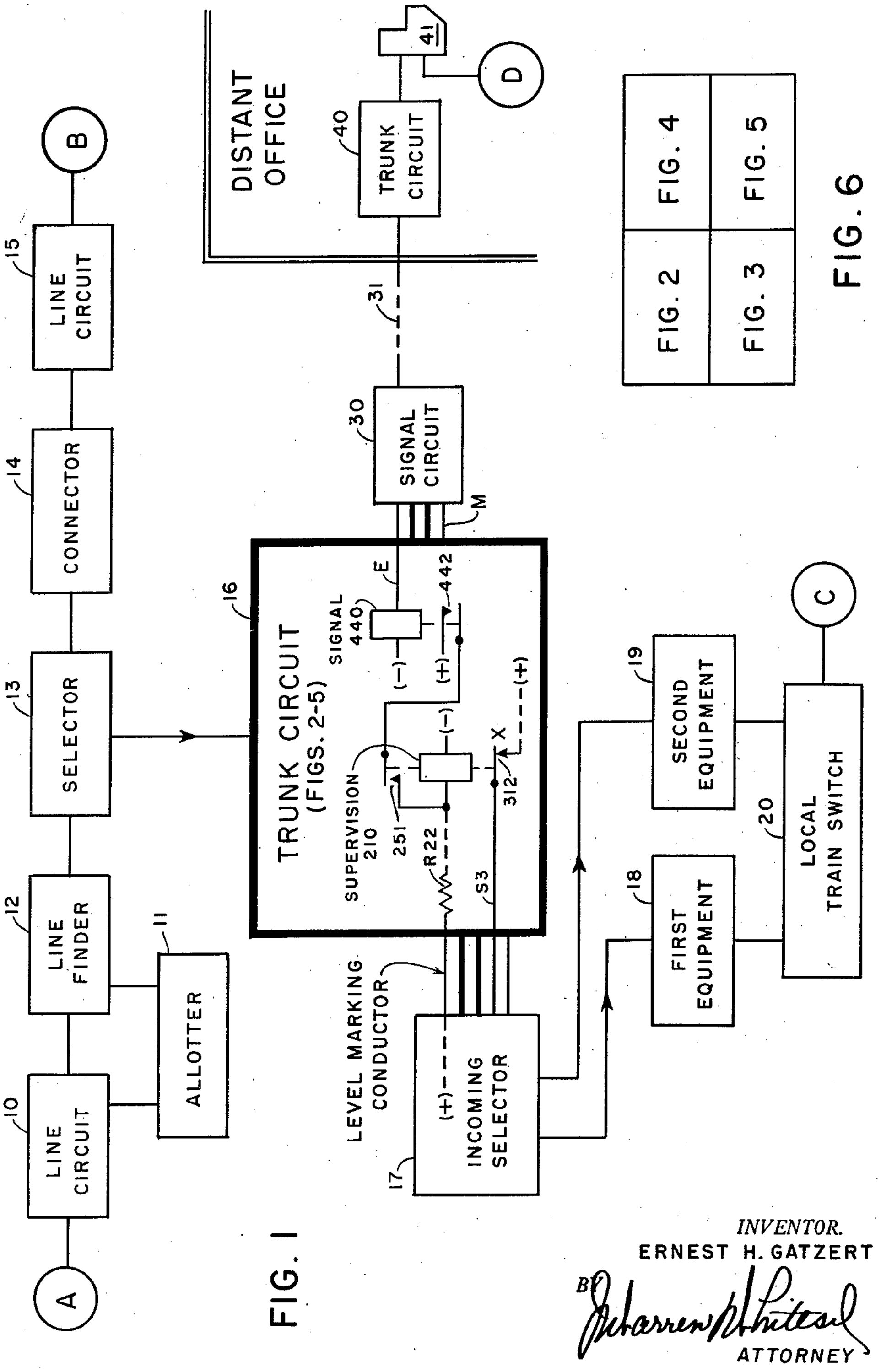
Fig. 1 shows by block diagram a typical telephone system utilizing the present invention.
Fig. 6 shows the manner in which Figs. 2–5 should be joined to provide a complete and understandable circuit.
Figure 2:
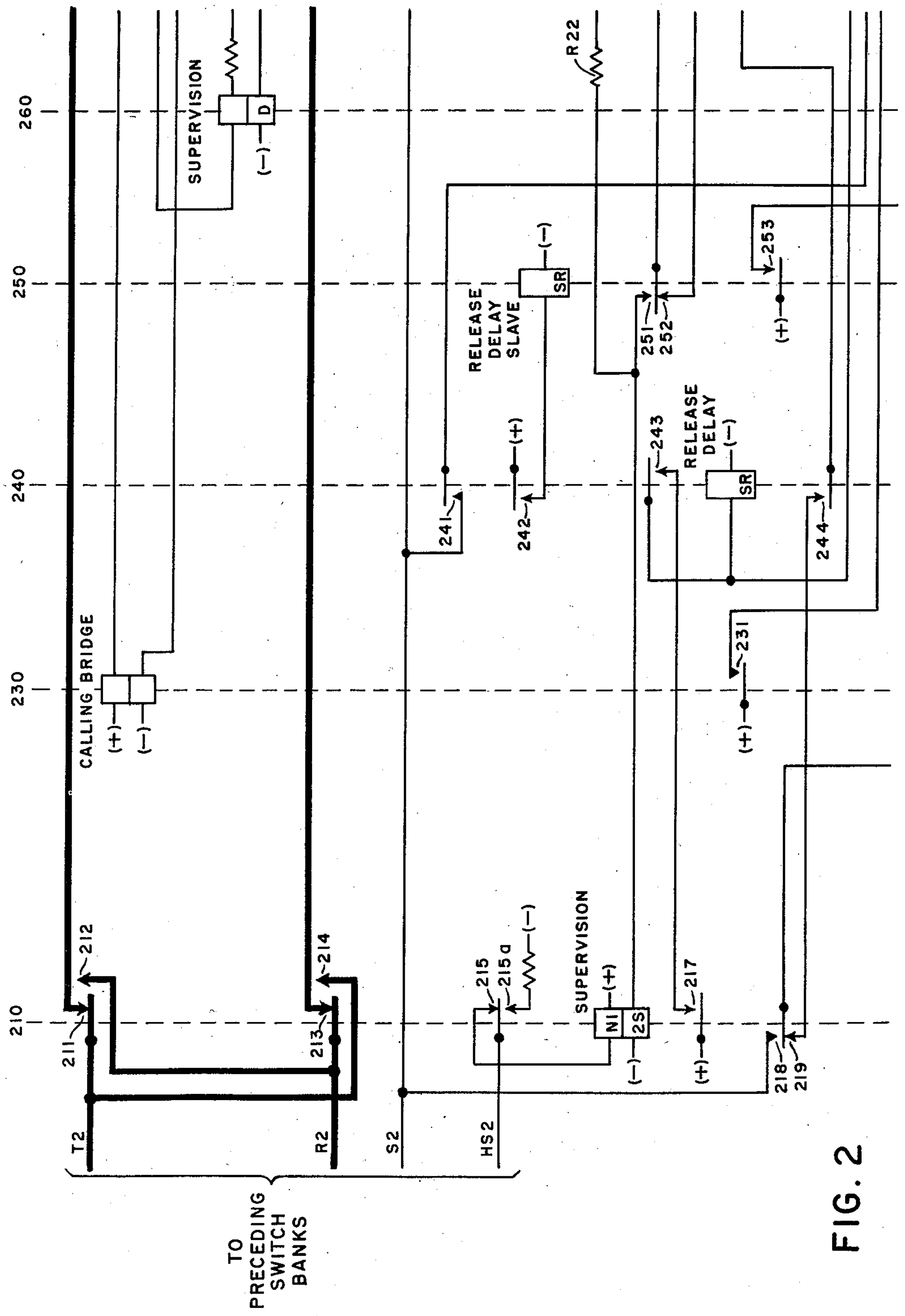
Figs. 2–5 show details of trunk circuit 16.

The portion of the system which contains the invention is the trunk circuit which is shown in Fig. 1 by means of heavily inked rectangle 16. This trunk circuit is also shown in detail in the remaining figures.

Figure 3:
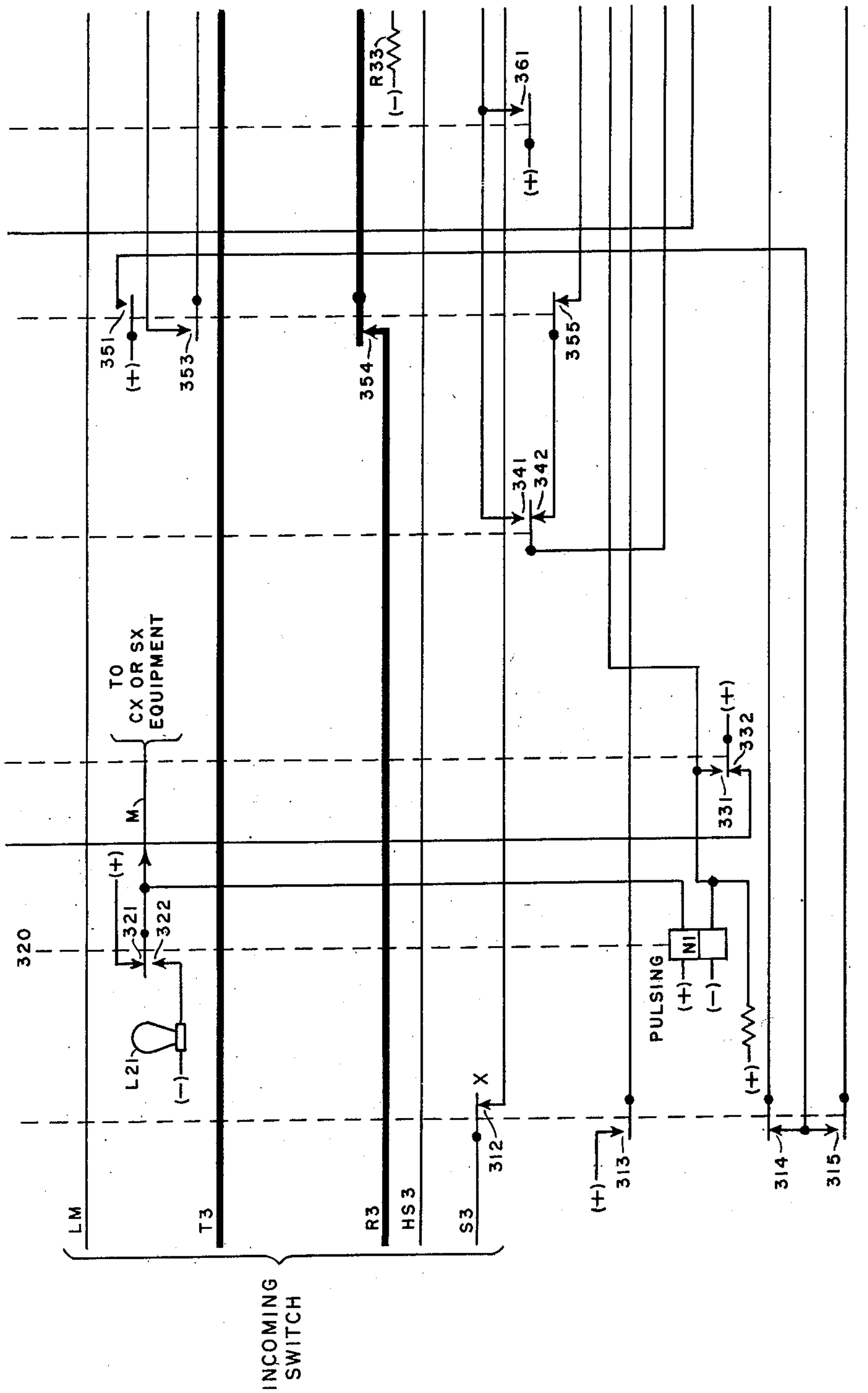
Figure 4:
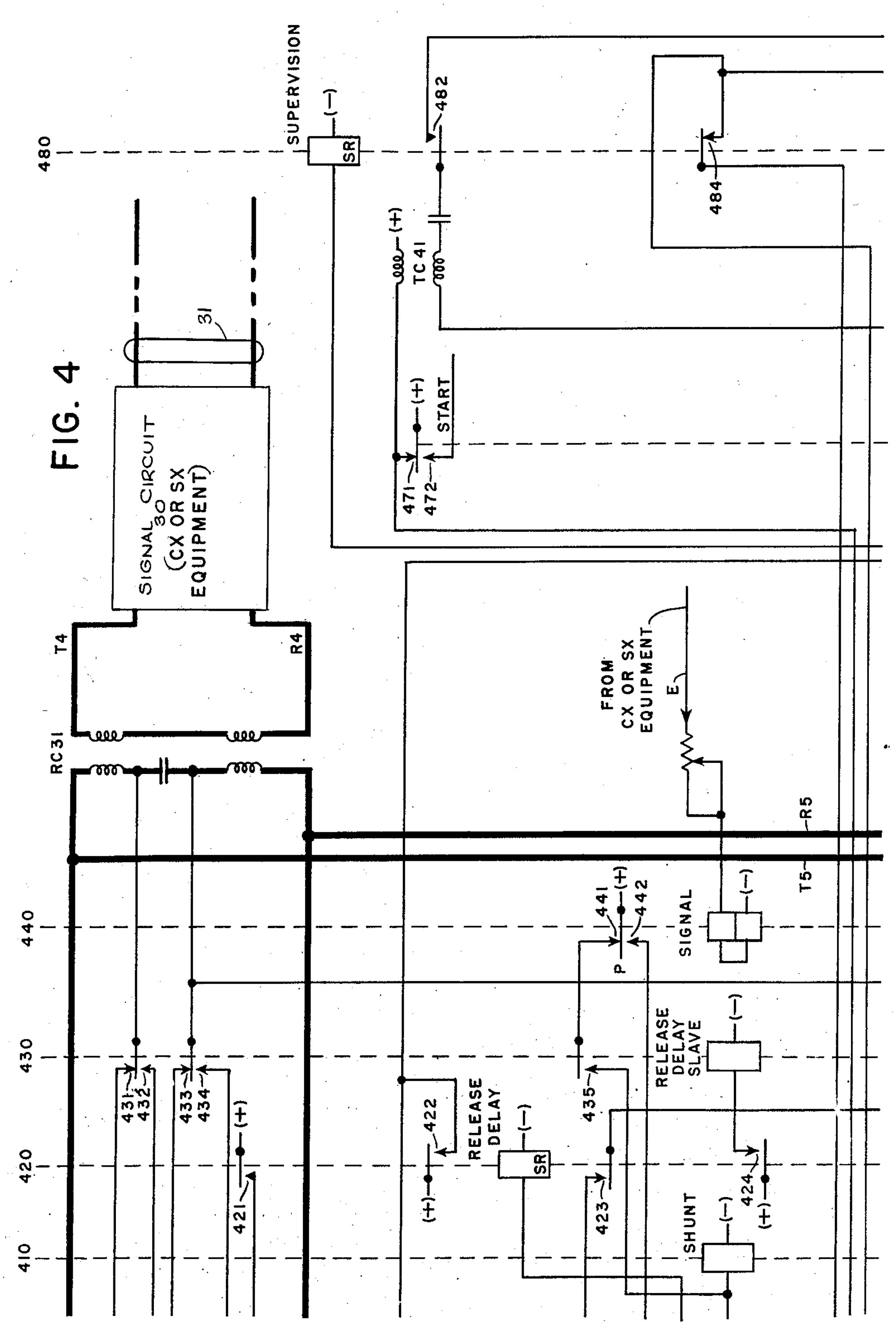
Figure 5:
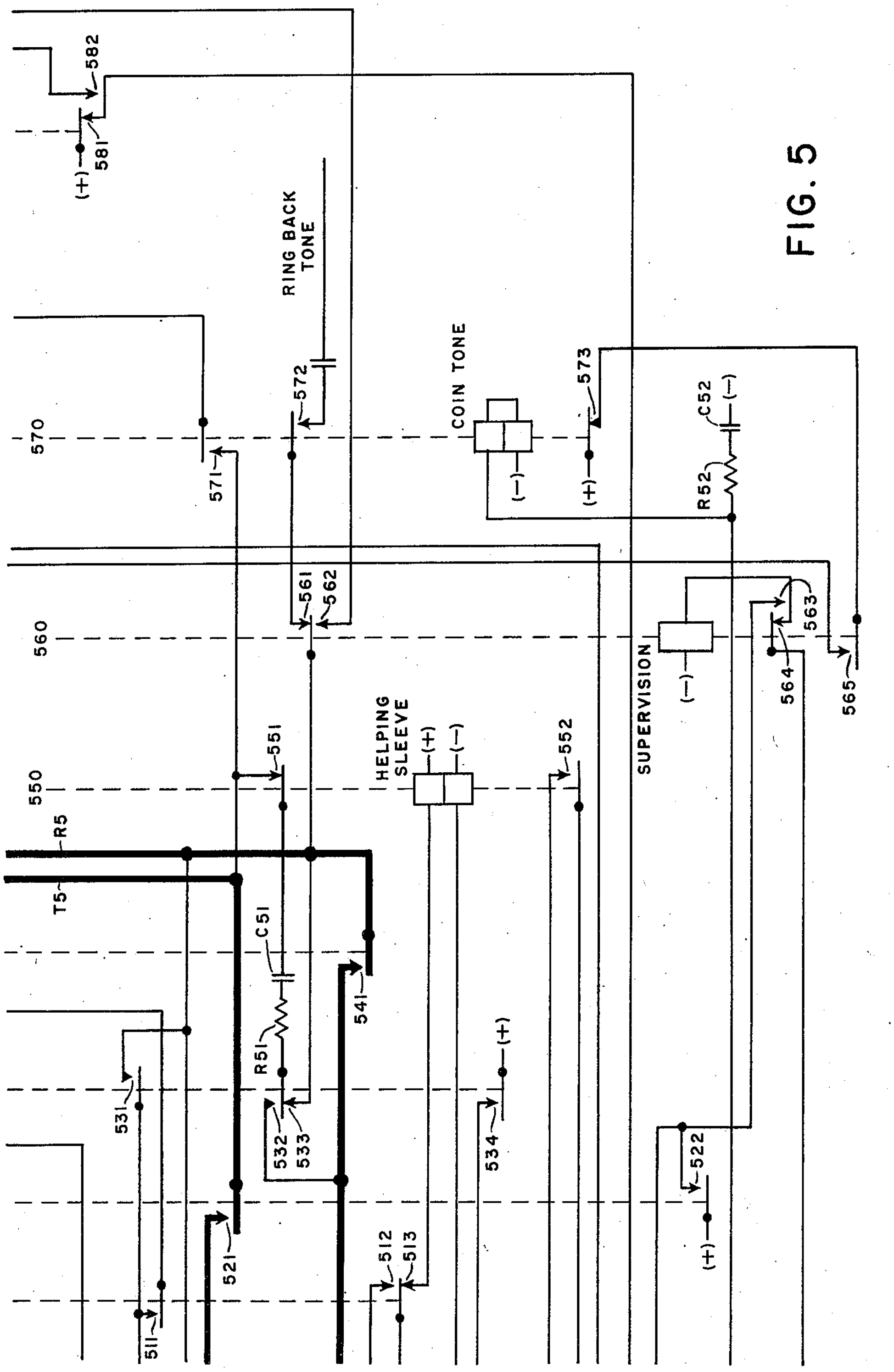

The term "CX or SX equipment" is used hereinafter in the specification and in Figs. 3 and 4 to describe composite and simplex signal equipment which may be incorporated in signal circuit 30. Composite and simplex equipment are well known devices for extending signals over a trunk line. It should be understood, however, that the invention is not limited to these but may be adapted to use other well known signal devices also.

BRIEF DESCRIPTION

Fig. 1 shows a telephone system which might be used to complete a call requiring the facilities shown in Figs. 2–5. There is, of course, the standard local switch train by means of which subscriber A may be connected with subscriber B. For example, subscriber A removes his receiver responsive to which suitable equipment in line circuit 10 causes allotter 11 to direct finder 12 to hunt for and find the calling line. A suitable number of digit pulses may be transmitted thereafter to direct selector 13 to seize connector 14 and subscriber B who is reached by way of line circuit 15. Or, if subscriber A dials the proper digits, selector 13 is used to seize trunk circuit 16 from which the call may be extended through signal circuit 30 and over trunk line 31 to the distant office where operator 41 may answer the call and complete it to any local subscriber D, as required. Supervision is returned from the distant office over trunk line 31 and signal circuit 30 to operate equipment in trunk circuit 16. Any suitable equipment in signal circuit 30 responds to these supervisory signals by applying ground to conductor E. Signal relay 440 responds to this ground marking to operate contacts 442. Contacts 251 are then closed; therefore, supervision relay 210 may be operated to its second step to perform supervisory functions.

Another type of call is one which may be extended from the distant office to a local subscriber, such as subscriber C, for example. In this case, the operator at position 41 extends the call through trunk circuit 40, trunk line 31 and signal circuit 30 to operate signal relay 440. At this time, contacts 251 are standing open so that contacts 442 are not effective for operating supervision relay 210. Thereafter the call is extended to incoming selector 17 in any suitable manner. If the call is for first equipment 18, it will be necessary for trunk circuit 16 to forward a special signal to provide for some special feature. On the other hand, if incoming selector 17 is driven to seize second equipment 19, it is necessary to remove the signal which is forwarded to first equipment 18. Therefore, the leveling marking conductor is selectively marked by incoming selector 17 depending upon the level to which it is directed. Assuming first that there is a marking of this type, ground (+) is extended through resistor R22 and the winding of supervision relay 210 to (−) battery. With the resistance of element R22 in the circuit, supervision relay 210 operates to its first step and controls only those contacts which are marked by the letter "X." In this case they are numbered 312.

When contacts 312 are opened, a ground (+) marking is removed from sleeve conductor S3. On the other hand, if selector 17 is driven to a level where the level marking conductor is not required, there is no ground potential for causing supervision relay 210 to operate. In this case the "X" or preliminary contacts 312 remain closed and ground is extended over conductor S3.

DETAILED DESCRIPTION

It is thought that the invention may be understood better by making reference to Figs. 2–5, which show details of trunk circuit 16. The access from selector 13 (Fig. 1) is also shown as conductors T2 and R2 in the upper lefthand corner of Fig. 2. The access to incoming selector 17 is shown near the lefthand edge of Fig. 3. Trunk line 31 which extends to the distant office is shown in the upper righthand corner of Fig. 4. The remaining elements in block 16 of Fig. 1 are shown with their proper circuits in Figs. 2–5.

*Outgoing call*

*Seizure.*—A call is placed when suitable equipment (not shown) seizes conductors T2 and R2 (upper lefthand corner of Fig. 2), thereby completing a loop across them. This loop is effective for operating calling bridge relay 230 over a circuit which may be traced from (—) battery through the lower winding of calling bridge relay 230, rest contacts 433, the lower lefthand winding of repeat coil RC31, contacts 213 and conductor R2 to the preceding equipment. The return path is over conductor T2, contacts 211, the upper lefthand winding of repeat coil RC31, rest contacts 431, the upper winding of calling bridge relay 230 to ground (+). Calling bridge relay 230 operates. Its function is to seize the trunk circuit and to receive and repeat digit pulses.

Contacts 231 close when calling bridge relay 230 operates thereby operating release delay relay 240. The circuit may be traced from ground (+) through contacts 231, 484 and the winding of release delay relay 240 to (—) battery. Contacts 331 close thereby energizing the lower winding of pulsing relay 320 over an obvious circuit.

Pulsing relay 320 operates at this particular time to transmit a seizure signal to the distant office over conductor M. Normally, conductor M is standing with ground applied at contacts 321. After relay 320 operates, this ground is replaced by (—) battery extended through the filament of lamp L21, closed contacts 322 and conductor M to the distant office. This transfer of potential sends a seizure signal to the distant office where suitable equipment responds to seize trunk line 31.

Release delay relay 240 operates. It is used to control the release of the trunk circuit and to hold it over the receipt of digit pulses. A circuit is completed for connecting ground (+) to sleeve conductor S2 thereby marking trunk circuit 16 as busy to all other equipment which may have access to it. The circuit for this marking may be traced from conductor S2 through operated contacts 241 to ground (+) on contacts 471 and in parallel therewith to ground (+) through the upper winding of tone coil TC41. Contacts 242 close to operate a release delay slave relay 250 over an obvious circuit. Contacts 243 close to prepare a locking circuit for release delay relay 240. A circuit is prepared for shunt relay 410 when contacts 244 close; however, that relay does not operate since contacts 332 are now standing open. Contacts 341 close thereby completing a circuit for operating helping sleeve relay 550. This circuit may be traced from (—) battery through the lower winding of helping sleeve relay 550, operated contacts 341 and rest contacts 581 to ground (+).

Release delay slave relay 250 operates. Its purpose is to assist relay 240 by carrying some of the contact load that otherwise would be carried by that relay. Contacts 251 and 253 close to prepare paths for operating supervision relays later during the call. Contacts 351 close to complete a path from ground (+) through contacts 351, 314 and the upper and lower windings of relay 570 to (—) battery. Contacts 354 open a point in talking conductors T3 and R3 which lead to the incoming switch because they are not used on this call. Contacts 355 have no function at this time.

Helping sleeve relay 550 operates and removes idle line termination at its contacts 551. Idle line termination is the circuit which previously could have been traced from conductor T5 through contacts 551, capacitor C51, resistor R51, contacts 533 and conductor R5. This termination is used to keep the trunk from becoming noisy due to an unbalanced condition. Contacts 552 have no function at this time.

Relay 570 operates. It closes its contacts 472 thereby extending ground potential over the start conductor to initiate the operation of any suitable common equipment which may be required to complete the call. Contacts 571 prepare a supervision path which is used later during the call. Contacts 572 close thereby extending ring back tone over contacts 561, conductor R5, contacts 213 and conductor R2 thereby informing the calling subscriber of the fact that his call is being completed.

*Answer.*—Nothing further happens until the operator at the manual exchange responds by completing a suitable connection with trunk line 31. Responsive thereto, ground is extended over conductor E by any suitable equipment (not shown). Signal relay 440 responds thereto and closes its contacts 442 while opening its contacts 441. It might be recalled that release delay slave relay 250 is in an operated condition at this time. Therefore, a circuit is completed from ground (+) through contacts 442, 251 and the lower winding of two step supervisory relay 210 causing it to operate to its second step. Parenthetically, it should be noted that this relay operates to its first step when a circuit is completed through its lower winding to ground (+) via resistor R22.

Supervisory relay 210 operates to transmit answer supervision to the calling subscriber. More particularly, contacts 211—214 operate to reverse the direction of battery flow over conductors T2 and R2. That is, before the operation of relay 210, a circuit could be traced from ground (+) through the upper winding of calling bridge relay 230 and over contacts 211 to tip conductor T2. After relay 210 operates, a similar circuit may be traced from ground (+) through the upper winding of calling bridge relay 230 and over operated contacts 212 to ring conductor R2. A similar circuit could be traced from (—) battery through the lower winding of calling bridge relay 230. Suitable equipment (not shown) responds to this reverse battery supervision to perform any supervisory functions which are necessary at this time. Before supervisory relay 210 operates, ground (+) is connected through the resistance of its noninductive upper winding and contacts 215 to conductor HS2. After relay 210 operates, this ground marking is removed from conductor HS2 and a (—) battery marking is substituted therefor at contacts 215a. Preceding equipment may use this signal to perform any function which may be required at this time. For example, this signal may be used to mark a toll call. Contacts 217 close to complete a locking circuit via contacts 243 for holding release delay relay 240 operated. Contacts 218 close to extend an alternate ground (+) to sleeve conductor S2 from contacts 332 after calling bridge relay 230 releases at the end of conversation. Contacts 312 have no function during this call. Contacts 313 close thereby extending ground (+) through the winding of supervision relay 480 to (—) battery, thus causing it to operate. Contacts 315 close the circuit for causing supervision relay 560 to operate. This circuit may be traced from (—) battery through the winding of relay 560, rest contacts 564, 315 and 351 to ground (+).

When supervision relay 560 operates, it opens its contacts 561 thereby removing ring back tone. Contacts 562 close to prepare part of a special tone circuit, which will be explained presently. Supervision relay 560 locks over a circuit which may be traced from (—) battery through its winding, operated contacts 563 and 253 to ground (+). An alternate ground marking for sleeve S2 is prepared at contacts 565. This marking will be completed from contacts 573 after relay 570 restores.

*Coin tone.*—When supervision relay 480 operates, it completes a circuit at contacts 482 for transmitting any suitable tone to the operator. For example, if it is assumed that the present call originated at a paystation, equipment which is not shown but which is in the line circuit for the paystation functions to apply a coin box tone to sleeve conductor S2. This tone is extended over the circuit which may be traced from conductor S2 through contacts 241 and the upper winding of tone coil TC41 to ground (+). Contacts 471 are standing open at this time. This tone is induced into the secondary or lower winding of tone coil TC41. At this time a circuit may be traced from ground (+) through the upper winding of calling bridge relay 230, rest contacts 431, the upper lefthand winding of repeat coil RC31, tip conductor T5, contacts 571, the lower winding of tone coil TC41, operated contacts 482, 562, conductor R5, the lower lefthand winding of repeat coil RC31, rest contacts 433 and the lower winding of calling bridge relay 230 to (−) battery. The operator at the distant exchange hears this tone and proceeds to take any action required properly to supervise the call. For example, she may collect coins at a proper time. The control of helping sleeve relay 550 is transferred from ground (+) at contacts 581 to ground (+) at contacts 231, which in turn is applied under the influence of calling bridge relay 230. This circuit may be traced from (−) battery through the lower winding of helping sleeve relay 550, operated contacts 341, 582 and 231 to ground (+).

When coin tone relay 570 originally operated over a circuit from (−) battery through its lower winding, its upper winding, rest contacts 314 and operated contacts 351 to ground (+), capacitor C52 was charged over this same circuit. When supervision relay 210 operates responsive to an answer signal extended over conductor E, contacts 314 open thereby breaking this same operate circuit to coin tone relay 570. However, it does not release immediately since fully charged capacitor C52 begins discharging through its windings. This holds it operated for a time interval which is determined by the amount of charge that is built upon capacitor C52; then, the discharging current stops and relay 570 releases. Therefore, after a brief interval of time, contacts 471 close to shunt the upper winding of tone coil TC41. Contacts 571 open to break a part of the connection extended through the lower winding of tone coil TC41 thereby removing the special tone from the talking conductors.

Conversation follows. Nothing further happens until the subscribers hang-up.

*Release.*—Assuming that the calling subscriber hangs-up first, the loop across tip and ring conductors T2 and R2 is open so that calling bridge relay 230 restores. Contacts 331 open, thus releasing pulsing relay 320. This opens contacts 322 and closes contacts 321 thereby switching conductor M from (−) battery to ground (+). This is a release signal which is transmitted to the distant office by suitable CX or SX equipment. Contacts 231 open to restore helping sleeve relay 550. It had held over the circuit including contacts 231, 582, 341 and the lower winding of relay 550 to (−) battery.

Nothing further happens until the operator at the distant exchange responds and takes down the connection. When she does so, the ground (+) marking is removed from conductor E by CX or SX equipment which is not shown. This marking formerly extended to the upper and lower windings of signal relay 440. Contacts 442 open to release relay 210. Responsive thereto, ground (+) is removed at contacts 217 and 313 thereby causing all equipment in the trunk circuit which is then operated to restore. The call has been returned to normal and nothing further happens until the next call is placed.

*Incoming call*

*Seizure.*—Next, it is assumed that an incoming call is received. This call may be extended over trunk line 31 from the operator at the distant office through repeat coil RC31. A seizure signal is transmitted from the distant office by any suitable means responsive to which ground is placed on conductor E by the CX or SX equipment. Signal relay 440 operates. Contacts 541 close to prepare part of the talking circuit. Contacts 442 close thereby operating release delay relay 420.

Relay 420 operates over a circuit which may be traced from (−) battery through the winding of relay 420, rest contacts 252 and operated contacts 442 to ground (+). The reason for operating release delay relay 420 is to control the release of the switch and to delay that release while digit pulses are being received. Contacts 421 close to differentially energize relay 260 so that it will not operate until the direction of current flow through its upper winding is reversed. Contacts 422 close to apply ground (+) to conductor S2 thereby marking it busy to outgoing equipment. Contacts 423 close to prepare a circuit for supervision relay 210. Contacts 424 close to operate release delay slave relay 430. This slave relay 430 serves merely to lighten the contact load that must be carried at this point. Contacts 521 close to complete part of the talking circuit to the incoming switch. Contacts 522 close to prepare a circuit for locking supervision relay 560.

When release delay slave relay 430 operates, it opens contacts 533 thereby breaking the idle line termination including resistor R51 and capacitor C51. Contacts 532 close to provide spark protection for pulsing contacts 541. Contacts 534 close to extend ground (+) over sleeve conductor S3.

Trunk circuit 16 has been seized. Incoming switch 17 was seized when contacts 521 operated. Nothing further happens until the operator at the distant office transmits a suitable number of digit pulses for setting incoming switch 17.

*Dialing.*—Each impulse that is transmitted from the distant office is in the form of a break in the ground (+) marking extended from CX or SX equipment over conductor E, thus causing signal relay 440 to restore once for each digit pulse. Responsive to the first restoration, contacts 441 close to complete a circuit through contacts 435 and the winding of shunt relay 410 thereby causing it to operate. Responsive to each inter-pulse period when contacts 441 are open, shunt relay 410 is deenergized; however, it does not restore due to its slow release characteristics until the end of the digit pulse train. When relay 410 operates, it closes a shunt to remove the inductive effect of repeat coil RC31 thereby improving loop pulsing characteristics. This shunt may be traced from the center of the lefthand windings of repeat coil RC31 through the lower lefthand winding, ring conductor R5, operated contacts 531, 511 and back to the center of the lefthand winding of repeat coil RC31. Shunt relay 410 also closes contacts 512 thereby extending (−) battery through the resistance of element R33 and over conductor HS3, thus marking a toll call.

Also responsive to each incoming digit pulse as received and repeated by signal relay 440, contacts 541 open to break the loop to the incoming switch, in the manner of the well known open loop pulses. The incoming switch is stepped under the influence of these pulses to a particular level and then driven automatically to seize idle terminals in that level. After the last digit pulse in a pulse train has been transmitted, shunt relay 410 does not receive any more pulses of energizing current from contacts 441; hence, shunt relay 410 restores. It closes contacts 513 thereby connecting helping sleeve relay 550 to conductor HS3. Relay 550 is operated to open contacts 551 thereby breaking the spark protection circuit which had included resistor R51 and capacitor C51 as well as contacts 532.

*Marked level.*—Means is provided for identifying the class of calls that are extended from a distant office. Briefly, if there is need for special treatment of this call, the level will be marked by a suitable potential which is connected to conductor LM by any well known level marking means in selector 17. Any well known special treatment may be provided by this trunk circuit during such marked calls. However, for purposes of explanation only, I have shown this treatment as a ground (+) marking which is forwarded from the trunk circuit on a selective basis over conductor S3 to exercise control at a distant point. For example, first equipment 18 (Fig. 1) may provide some feature such as conversation timing on nontoll calls, while second equipment 19 may not. Obviously, many other features could be provided also. This ground marking is transmitted through contacts 534 and 312 to sleeve S3, if there is no level marking. This ground marking is removed if there is level marking.

In greater detail, assuming that a marked level is reached and that conductor LM is marked by a suitable ground potential, a circuit is completed from conductor LM through operated contacts 423, resistor R22 and the lower winding of supervision relay 210 to (−) battery. Relay 210 is constructed so that it will operate only to its first step when energized in series with resistor R22, but will operate to its second step when energized by direct ground that is without such resistance. On its first step, supervision relay 210 operates only its "X" or preliminary contacts 312 thereby removing the ground (+) marking normally extended over conductor S3. If there were no level marking, conductor LM would be standing open, relay 210 would not operate and ground would be returned over conductor S3.

Any remaining digit pulse trains which have not been sent already are now used to set local switch train 20 to seize and signal the called subscriber.

*Answer.*—When the called subscriber answers, suitable equipment (not shown) reverses the direction of battery flow over conductors T3 and R3. Responsive thereto, the direction of current flow through the upper winding of supervision relay 260 is reversed causing it to operate. The circuit may be traced from conductor R3, through contacts 354, 541, conductor R5 through the lower lefthand winding of repeat coil RC31, operated contacts 434, the upper winding of relay 260, operated contacts 432, the upper lefthand winding of repeat coil RC31, conductor T5, and contacts 521 to conductor T3. When supervision relay 260 operates, it closes its contacts 361 thereby energizing the lower winding of helping sleeve relay 550.

At the end of the call, release is completely under the control of the calling subscriber and hence from the distant office. Ground is removed from conductor E when the distant office releases. Responsive thereto, signal relay 440 restores. Contacts 442 open thus removing ground (+) from its connection via contacts 252 with release delay relay 420. Relay 420 restores. Responsive thereto, all equipment then operated is released and the circuit is returned to normal and made ready for the next call.

While I have shown and described a single embodiment of my invention, it should be obvious that various modifications could be made without departing from the scope of my invention. Therefore, it is my intention to cover within the appended claims not only the particular embodiment shown, but all other embodiments which may fall within the true spirit of my invention.

What I claim is:

1. In a telephone system, a local office, a distant office, means including a trunk extending between said local office and said distant office, a trunk circuit in said local office terminating said trunk line, means for extending calls from said local office to said distant office or from said distant office to said local office, a two step relay in said trunk circuit, means for operating said relay to one of its said two steps during calls from said local office to said distant office, means responsive to operation of said relay to its said one step for returning supervisory signals to said local office, means for identifying the class of calls extended from said distant office, means responsive to said last named means and effective during the completion of calls from said distant office to said local office for selectively leaving unoperated or operating said relay to the other of its said two steps depending upon the class of said calls, control means in said trunk circuit, and means responsive to said operation of said relay to said other step for controlling said control means.

2. The telephone system of claim 1 and a plurality of conductors interconnecting said trunk circuit and said means for extending calls from said distant office to said local office, means whereby said means for identifying said calls is effective over one of said conductors, and means whereby said control means is effective over another of said conductors.

3. In a telephone system, a distant office and a local office, means including a two-way trunk line extending between said offices, a trunk circuit terminating said two-way trunk line in said local office, a local switch train in said local office having access to said trunk circuit on outgoing calls to said distant office, a two step relay in said trunk circuit, means in said trunk circuit responsive to supervision extended from said distant office over said trunk line for operating said two step relay to a one of its two steps, means responsive to operation of said relay to said one step for returning reverse battery supervision to said local switch train, means for extending calls from said distant office over said trunk line to said local office, said last named means including at least an incoming selector, said incoming selector having a bank of contacts which are divided into a plurality of levels, level marking means associated with said incoming selector for selectively marking calls which are directed through particular levels in said incoming selector, means responsive to said level marking means effective on calls directed through said particular levels for selectively operating said relay to the other of its said two steps, and means responsive to the operation of said relay to said other step for selectively transmitting or eliminating special signals which may be transmitted to said incoming selector.

4. The telephone system of claim 3 and a connection between said trunk circuit and said incoming selector comprising at least a sleeve conductor, said special signal comprising a particular potential marking extended over said sleeve conductor.

References Cited in the file of this patent

UNITED STATES PATENTS 2,214,256 Peterson -------------- Sept. 10, 1940